United States Patent [19]

Sweeny et al.

[11] 3,737,384
[45] June 5, 1973

[54] DECOMPOSITION OF HALOGENATED ORGANIC COMPOUNDS USING METALLIC COUPLES

[75] Inventors: Keith H. Sweeny, West Covina; James R. Fischer, Claremont, both of Calif.

[73] Assignee: The United States of America as represented by the Secretary of the Interior, Washington, D.C.

[22] Filed: Dec. 23, 1970

[21] Appl. No.: 100,975

[52] U.S. Cl..................................210/59, 260/649
[51] Int. Cl................................................C02c 5/02
[58] Field of Search.....................210/42, 50, 29, 59, 210/62, 64, 501; 260/649 DD, 649 D, 653.5

[56] References Cited

UNITED STATES PATENTS 3,391,204  7/1968  Young..........................260/653.5 X

OTHER PUBLICATIONS

Hornstein, I., Use of Granulated Zinc Columns for Determining Chlorinated Organic Insecticides, J. Agr. Food Chem. 5:37 (1957).
Faust, S. D., et al., Water Pollution by Organic Pesticides, J. AWWA 56:267 (1964).

Primary Examiner—Samih N. Zaharna
Assistant Examiner—Thomas G. Wyse
Attorney—Ernest S. Cohen and Roland H. Shubert

[57] ABSTRACT

Halogenated organic compounds, especially chlorinated organic pesticides, are decomposed by reaction with metallic couples in a mildly acidic environment.

7 Claims, 3 Drawing Figures

INVENTORS
KEITH H. SWEENY
JAMES R. FISCHER

BY Ernest J. Cohen
Roland H. Shubert

ATTORNEYS

DECOMPOSITION OF HALOGENATED ORGANIC COMPOUNDS USING METALLIC COUPLES

BACKGROUND OF THE INVENTION

Many of the halogenated organic compounds, especially chlorinated organic pesticides such as DDT, are quite stable. Consequently, they are persistent in the natural envionment and severe reaction conditions are ordinarily required for their rapid decomposition.

Many reaction methods are taught by the prior art to decompose such compounds but none of these methods are applicable to the detoxification of water such as process wastes, or soil, having low concentrations of pesticide.

SUMMARY OF THE INVENTION

We have found that certain metallic couples act as efficient reducing and dehalogenating agents when reacted with halogenated organic compounds under mildly acidic conditions. Metallic couples found to be effective in the reaction comprise a combination of a minor amount of catalytic metal, such as copper or silver, with a major amount of a reductant metal such as zinc, aluminum, iron, cadmium and magnesium. Couples comprising one or more catalytic metals with two or more reductant metals are also effective. Examples of metallic couples found to be effective in the reaction include zinc-copper, zinc-silver, iron-copper, aluminum-copper, magnesium-copper, cadmiun-copper and zinc-iron-copper.

The reaction is relatively rapid at room temperature but higher temperatures may be used to advantage. Mildly acidic conditions are necessary with a preferred pH range of about 1.5 to about 4.

Hence, it is an object of our invention to provide a method for dehalogenating organic compounds.

It is a further object of our invention to detoxify waters and soils.

A specific object of our invention is to remove DDT from process waste waters.

DETAILED DESCRIPTION OF THE INVENTION

Figure 1:
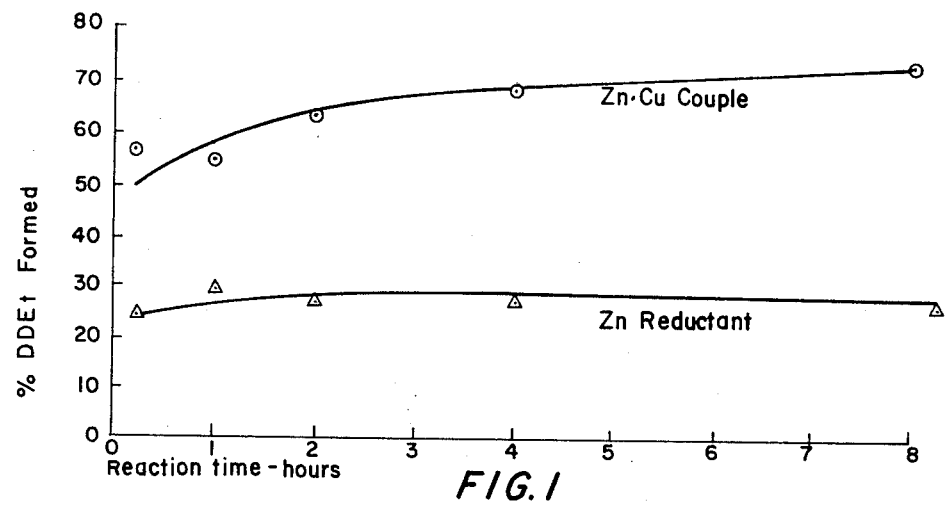

Our previous work with the zinc degradation of DDT and similar pesticides, disclosed and claimed in co-pending, commonly assigned application Ser. No. 101,201, now U.S. Pat. No. 3,640,821, tended to indicate that reduction of DDT may proceed by way of a complex, two-path reaction. A portion of the p,p'-DDT appears to be rapidly converted to the ethane derivative, 1,1 bis(p-chlorophenyl)-ethane referred to as DDEt, losing all three aliphatic chlorine atoms. Another portion appears to be reduced in a stepwise and much slower fashion. This reaction appears to progress from p,p'-DDT to p,p'-DDD (2,2 bis(p-chlorophenyl)-1,1-dichloroethane) to DDMS (2,2 bis(p-chlorophenyl)-1-chloroethane) and finally to DDEt. The latter product, DDEt, is a preferred reaction product since it appears to have far less physiological activity than DDT or the other intermediate products.

We have found that use of particular metallic couples as the reducing agent for halogenated organic compounds, particularly such pesticides as DDT, results in substantial advantages compared with use of zinc alone. A marked increase in reaction rate is observed but, more importantly, the proportion of relatively innocuous decomposition products increases.

Our preferred couples are zinc-copper, iron-copper and aluminum-copper, but other couples showing substantial reductive activity include zinc-silver, magnesium-copper, and cadmium-copper. Mildly acidic reaction conditions are necessary with the preferred reaction pH ranging from about 1.5 to about 4. Reaction temperature may range from ambient to moderately elevated or within the general range of about 0° to about 100° C. Even higher temperatures may be employed but would require use of pressurized reaction equipment. When reacting low concentrations of pesticide in waste waters, it is preferred to operate at the temperature of the waste stream which will usually range from about 20° to about 80° C. The reaction medium may comprise water, organic solvents or mixtures of the two.

The metallic couples which we have found useful may be described as catalyzed metal reductants. They may be prepared by depositing, preferably by chemical means, a thin film or layer of a catalytic metal such as copper or silver upon a metal reductant such as zinc or they may alternatively be prepared in the form of an alloy. The effect appears to be truly catalytic since the copper or silver may be recovered in metallic form at the conclusion of the reaction.

It is expected that our invention will prove most useful in the decomposition of halogenated organic residues to produce less highly halogenated products. Specific uses contemplated include the decomposition of chlorinated organic pesticides such as DDT found in process waste waters and even in soils.

Specific embodiments of our process are set out in the following examples.

EXAMPLE 1

A zinc-copper couple was formed by adding an aqueous solution of cupric chloride to an acetone suspension of technical grade zinc dust. Copper addition was in the amount of 1 meq per gram of zinc. The usual grey color of zinc immediately darkened to a brown to black appearance indicating copper precipitation on the zinc particles. A suspension of the zinc-copper couple was then acidified to 0.5 normal using acetic acid and was reacted at 25° C on an equal weight (metal to pesticide) basis with DDT. Comparative tests using zinc alone under identical conditions were also performed. Analyses for residual DDT and for several of the major decomposition products of the reaction were performed periodically after initiation of the reaction.

Figure 2:
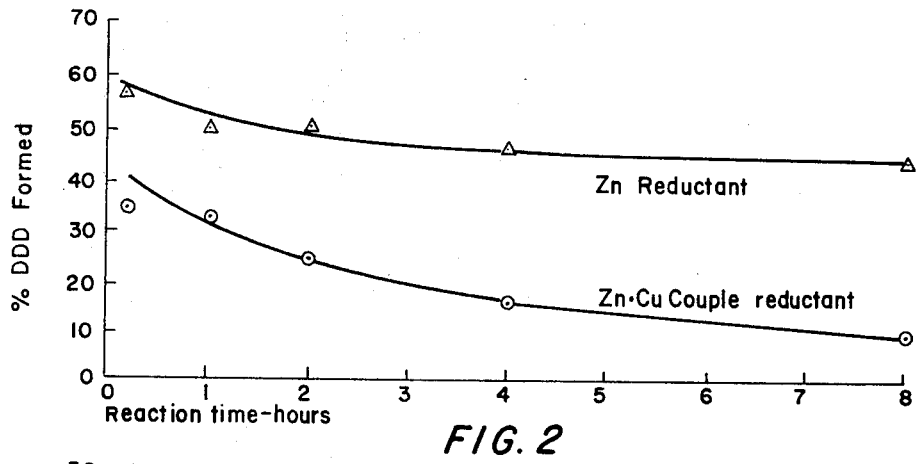
Figure 3:
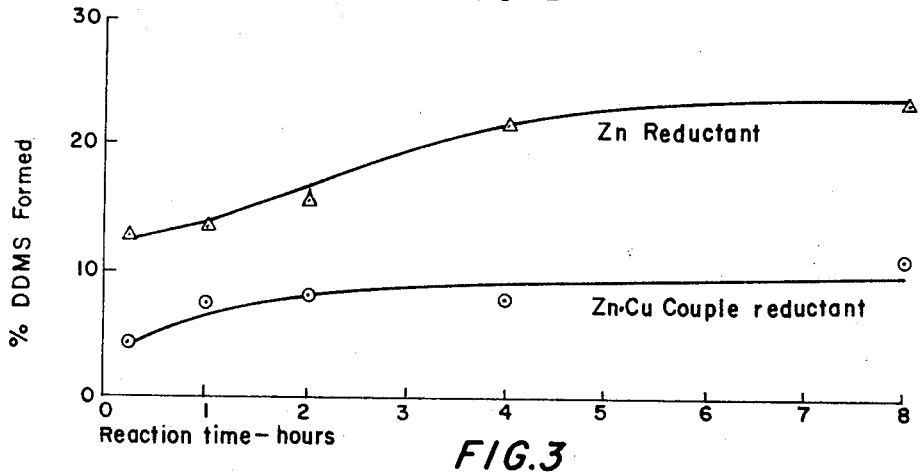

Results of these analyses are presented as FIGS. 1–3.

FIG. 1 shows the rate of formation of bis(p-chlorophenyl)-ethane (DDEt) using a zinc-copper couple as the reductant as compared to the rate of formation using zinc alone. As may be seen, the amount of DDEt product formed in an equivalent time was 1.9 to 2.7 times greater in the samples in which the zinc-copper couple was used compared to those in which zinc was the reductant. Since DDEt is considered to be the least hazardous and most desirable degradation product of DDT, the advantages of the copper-zinc couple are evident.

FIG. 2 depicts the rate of formation of bis(p-chlorophenyl) dichloroethane (DDD) as a degradation product of DDT. DDD is considered to be a highly undesirable product since it, like DDT, is believed to affect the reproductive mechanisms of birds. Those samples in which a zinc-copper couple was used as the reductant produced substantially less DDD than did the samples using zinc alone.

In FIG. 3, there is shown the rate of formation of bis(-p-chlorophenyl)-chloroethane (DDMS) as a degradation product of DDT. Concentration of this compound was reduced by a factor ranging from 1.8 to 2.8 when using the zinc-copper couple as compared to the use of zinc alone as the reductant.

EXAMPLE 2

A series of tests were run varying the ratio of copper to zinc used in forming the zinc-copper couple. In these tests, the efficacy of the reduction of DDT after 15 min. reaction at 25° C was compared. In all cases, DDT was reacted with an equal weight of zinc metal and the acidity of the reaction medium was adjusted to 0.5 N at the reaction start. Proportion of copper was varied from 0.1 to 10.0 meq per gram of zinc.

Over the entire range of copper concentration tested, the zinc-copper couple proved superior to the use of zinc alone. Best results were obtained, however, at a copper to zinc ratio of about 1 meq of copper per gram of zinc.

EXAMPLE 3

Several different methods for the preparation of the zinc-copper couple were compared. In the first, zinc powder was washed quickly with dilute hydrochloric acid, rinsed with water, treated with dilute (2 percent) cupric sulfate solution, then washed with water and acetone. The wet sample was then used immediately.

Secondly, a zinc-copper couple was prepared in generally similar manner except that the formed couple was thoroughly washed with absolute ether, filtered and thoroughly dried overnight by vacuum desiccation ($P_2O_5$ desiccant) before use.

The third couple was prepared by a high temperature reduction of cupric oxide mixed with zinc dust using hydrogen as the reducing agent. The reaction mass, essentially in the form of an alloy, was cooled, ground to a fine power and dried before use.

All three preparations were tested in the reduction of DDT for 1 hour at 25° C. All three were found to be efficient reducing agents for DDT but the hot, reduced zinc-cupric oxide couple was slightly less effective than the other two.

EXAMPLE 4

An aluminum-copper couple was prepared by adding 1 meq of cupric chloride in aqueous solution to 1 g of aluminum powder. The couple was then reacted with an equal weight of DDT at 25° C in a reaction medium acidified to 0.5 N using either acetic or sulfuric acid. Essentially all of the DDT was converted but the major reaction product was different than that obtained using either zinc or a zinc-copper couple as the reductant. The acetone-soluble portion of the reaction product accounted for only about 5.3 percent of the DDT converted. Remaining product was in the form of a voluminous precipitate insoluble in ethanol and hexane as well as acetone but soluble in warm benzene. When extracted and recrystallized, a product with a melting point of 267° C was obtained in an amount equal to 86.2 percent of the initial weight of the DDT.

Infrared analyses showed the presence of C-Cl bonds but no carbonyl or phenolic hydroxyl. It was hypothesized that the compound might be tetra(p-chlorophenyl)-tetrachlorobutane, formed by reductive coupling of two DDT molecules according to the following reaction:

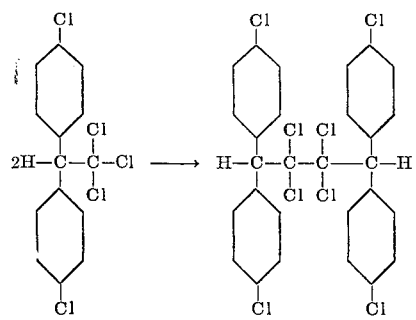

Elemental analysis of the compound having the elemental formula $C_{28}H_{18}Cl_8$ is consistent with this hypothesis:

|  | C% | H% | Cl% |
|---|---|---|---|
| Theoretical | 52.6 | 2.82 | 44.5 |
| Found | 51.8, 51.2 | 3.0, 2.6 | 42.7, 43.0 |

Nuclear magnetic resonance spectroscopy gave results which are also consistent with the hypothesized structure. The postulated compound is known in the literature and has been prepared by reducing DDT with hydrogen using a palladium catalyst. Reported melting point of 270° C compared closely with the 267° C value obtained.

Similar results were obtained when an aluminum-copper alloy was used as the reductant. In contrast, when aluminum powder alone was contacted with DDT under identical conditions, essentially no reaction occurred.

EXAMPLE 5

An iron-copper couple was prepared, again using 1 meq of aqueous cupric chloride per gram of iron. The prepared couple was then reacted with an equal weight of DDT in an acetone-water medium acidified to 0.5 N using either acetic or sulfuric acid. Like in the aluminum-copper system, an acetone insoluble precipitate amounting to 57.6 percent of the initial weight of DDT (equivalent to 64% DDT) was formed. The crystalline solid had a melting point of 265°–267° C and a mixed melting point determination with authentic 1,1,4,4-tetra(p-chlorophenyl)-2,2,3,3-tetrachlorobutane showed no depression. While the iron copper couple gave substantial degradation of DDT to form the tetrachlorobutane derivative as a major product, it did not appear to be as effective as the aluminum-copper couple.

In contrast, reaction of DDT with iron powder under identical conditions gave only slight conversion of DDT with essentially no production of the tetrachlorobutane derivative.

EXAMPLE 6

Another metallic couple was formed by the combined addition of iron and copper salts to zinc dust. Activity of this couple was approximately the same as that obtained by use of the zinc-copper couple. When reacted with DDT, the iron-copper-zinc couple produced degradation products comparable to those produced by use of the zinc-copper reductant.

EXAMPLE 7

A magnesium-copper couple, formed using 1 meq of copper per gram of magnesium, was reacted with an equal weight of DDT under the same conditions used in Example 5. Some reduction of DDT occurred but none of the tetrachlorobutane derivative appeared in the product. Magnesium metal alone was substantially less reactive than was the magnesium-copper couple.

EXAMPLE 8

A cadmium-copper couple was prepared by reaction of 1 meq cupric salt with cadmium metal. The couple was reacted with an equal weight of DDT under the conditions of Example 5. Substantial degradation of DDT occurred without formation of the tetrachlorobutane derivative.

EXAMPLE 9

A zinc-silver couple was prepared in a fashion similar to that used in preparing zinc-copper couples. The metal couple was reacted with an equal weight of DDT and, based upon the rate of disappearance of DDT, was found to be about as effective as the zinc-copper couple. However, there was observed the formation of an acetone insoluble product fraction amounting to approximately 57 percent by weight of the DDT reacted. A crystalline solid melting in the range of 226°–228° C was recovered by benzene extraction.

EXAMPLE 10

A zinc-copper couple was used to reduce DDT in an aqueous medium. DDT in emulsifiable concentrate form was added to water which was acidified to 0.018 N in sulfuric acid. Initial DDT concentration was 421 ppm, typical of waste water streams from a DDT manufacturing process. Zinc-copper couple in an amount equal to the weight of the DDT was added and allowed to react for 1 hr. at 75°–77° C; a temperature typical of DDT plant wash effluents.

At the end of the reaction period, the DDT concentration was reduced to about 1 ppm with nearly complete conversion to DDEt. Other tests performed under similar conditions using hydrochloric rather than sulfuric acid appeared to give slightly greater conversion to DDEt.

EXAMPLE 11

In another series of tests, the zinc-copper couple was employed for the reduction of the following compounds: toxaphene, chlordane, dieldrin, endrin, aldrin, heptachlor and polychlorinated polyphenyls. In all cases, the reaction was carried out at 25° C under mildly acidic conditions using equal weights of metal couple and chlorinated compounds. Substantial conversion of all of those compounds tested was confirmed by gas chromatography and by an increase in the soluble chloride in the reaction medium.

What is claimed is:

1. A process for the decomposition of halogenated organic compounds chosen from the group consisting of chlorinated organic pesticides and polychlorinated polyphenyls which comprises reacting the compounds with a metallic copule consisting essentially of a minor amount of a catalytic metal chosen from the group consisting of copper, silver, and mixtures thereof in intimate physical admixture with a major amount of reductant metal chosen from the group consisting of zinc, aluminum, iron, magnesium, cadmium, and mixtures thereof under acidic conditions.

2. The process of claim 1 wherein the metallic couple is chosen from the group consisting of zinc-copper, zinc-silver, aluminum-copper, iron-copper, magnesium-copper and cadmium-copper.

3. The process of claim 2 wherein the chlorinated organic pesticide is DDT and wherein the metallic couple is chosen from the group consisting of zinc-copper, aluminum-copper and iron-copper.

4. The process of claim 3 wherein the process is carried out in aqueous medium at a pH within the range of about 1.5 to about 4.

5. The process of claim 4 wherein the aqueous medium is acidified with an acid chosen from the group of sulfuric and hydrochloric acids.

6. The process of claim 5 wherein the reaction is carried out at a temperature in the range of about 20° to about 80° C.

7. The process of claim 6 wherein the DDT in aqueous medium comprises a waste water from DDT manufacture.

* * * * *